United States Patent
Pau et al.

(10) Patent No.: US 10,330,779 B2
(45) Date of Patent: Jun. 25, 2019

(54) LASER BEAM CONTROL METHOD, CORRESPONDING DEVICE, APPARATUS AND COMPUTER PROGRAM PRODUCT

(71) Applicant: STMICROELECTRONICS S.r.l., Agrate Brianza (IT)

(72) Inventors: Danilo Pietro Pau, Sesto San Giovanni (IT); Emanuele Plebani, Sotto IL Monte Giovanni (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 15/692,689

(22) Filed: Aug. 31, 2017

(65) Prior Publication Data
US 2018/0246188 A1    Aug. 30, 2018

(30) Foreign Application Priority Data
Feb. 27, 2017    (IT) .......... 102017000021559

(51) Int. Cl.
*G01S 7/04*    (2006.01)
*G01S 7/484*    (2006.01)
(Continued)

(52) U.S. Cl.
CPC ............. *G01S 7/484* (2013.01); *G01S 7/48* (2013.01); *G01S 7/4814* (2013.01);
(Continued)

(58) Field of Classification Search
CPC ...... G01S 7/484; G01S 7/4814; G01S 7/4868; G06K 9/00255; G06K 9/00362; G06K 9/00617; G06K 9/00791; H05B 37/0227
(Continued)

(56) References Cited

U.S. PATENT DOCUMENTS 8,952,628 B1 *    2/2015    Gordin .............. H05B 37/0227
                                                315/291
2005/0046584 A1 *    3/2005    Breed .................... B60C 11/24
                                                340/13.31
(Continued)

FOREIGN PATENT DOCUMENTS

WO    2005/048191 A2    5/2005
WO    WO 2005048191 A2 *    5/2005    ............. G06K 9/344

OTHER PUBLICATIONS

Italian Search Report, dated Nov. 23, 2017, for corresponding Italian application No. IT201700021559, 8 pages.
(Continued)

*Primary Examiner* — Douglas W Owens
*Assistant Examiner* — Syed M Kaiser
(74) *Attorney, Agent, or Firm* — Seed IP Law Group LLP (57) ABSTRACT

A laserbeam light source is controlled to avoid light sensitive regions around the laserbeam light source. One or more laserlight-sensitive regions are identified based on images of an area around the laserbeam light source, and indications of positions corresponding to the laserlight-sensitive regions are generated. The laserbeam light source is controlled based on the indications of the positions. The laserbeam light source may be controlled to deflect a laserlight beam away from laserlight-sensitive regions, to reduce an intensity of a laserlight beam directed towards a laserlight-sensitive region, etc. Motion estimation may be used to generate the indications of positions corresponding to the laserlight-sensitive regions.

29 Claims, 2 Drawing Sheets

(51) Int. Cl.
G01S 17/89 (2006.01)
G01S 17/93 (2006.01)
G01S 7/48 (2006.01)
G01S 7/497 (2006.01)
G01S 7/481 (2006.01)
G01S 7/486 (2006.01)
G06K 9/00 (2006.01)
H05B 37/02 (2006.01)

(52) U.S. Cl.
CPC ............ *G01S 7/4868* (2013.01); *G01S 7/497* (2013.01); *G01S 17/89* (2013.01); *G01S 17/936* (2013.01); *G06K 9/00255* (2013.01); *G06K 9/00362* (2013.01); *G06K 9/00617* (2013.01); *G06K 9/00791* (2013.01); *H05B 37/0227* (2013.01)

(58) Field of Classification Search
USPC ................................................. 315/307, 224
See application file for complete search history.

(56) References Cited

U.S. PATENT DOCUMENTS

| | | | | |
|---|---|---|---|---|
| 2005/0063566 | A1* | 3/2005 | Beek | A61B 5/0059 382/115 |
| 2005/0189503 | A1* | 9/2005 | Jamieson | G01N 21/251 250/559.4 |
| 2010/0177929 | A1* | 7/2010 | Kurtz | G06K 9/00228 382/103 |
| 2013/0300838 | A1* | 11/2013 | Borowski | G01S 7/486 348/46 |
| 2014/0211012 | A1* | 7/2014 | Nerayoff | H04N 7/181 348/148 |
| 2015/0070489 | A1* | 3/2015 | Hudman | G06T 7/0057 348/135 |
| 2016/0006914 | A1* | 1/2016 | Neumann | G06F 3/0325 348/78 |
| 2017/0184450 | A1* | 6/2017 | Doylend | G01J 1/4228 |
| 2017/0273161 | A1* | 9/2017 | Nakamura | H05B 37/0227 |
| 2017/0310948 | A1* | 10/2017 | Pei | G01S 7/484 |

OTHER PUBLICATIONS

Cootes et al., "Active Appearance Models," *IEEE Transactions on Pattern Analysis and Machine Intelligence* 23(6):681-685, Jun. 2001.
Huang et al., "High speed, high power one-dimensional beam steering from a 6-element optical phased array," *Optics Express* 20(16):17311-17318, Jul. 2012.
Hulme et al., "Fully integrated hybrid silicon free-space beam steering source with 32 channel phased array," *Proceedings of SPIE* 8989, 15 pages, 2014.
Kakumanu et al., "A survey of skin-color modeling and detection methods," *Pattern Recognition* 40:1106-1122, 2007.
LaserPointerSafety.com, "Frequently Asked Questions," retrieved from http://www.laserpointersafety.com/FAQ/FAQ.html on Aug. 30, 2017, 26 pages.
Mobileye, "The Road to Full Autonomous Driving: Mobileye and STMicroelectronics to Develop EyeQ®5 System-on-Chip, Targeting Sensor Fusion Central Computer for Autonomous Vehicles," News Release, May 17, 2016, 4 pages.
Nvidia, "The AI Car Computer for Autonomous Driving," retrieved from http://www.nvidia.com/object/drive-px.html on Aug. 30, 2017.
Paszke et al., "ENet: A Deep Neural Network Architecture for Real-Time Semantic Segmentation," arXiv preprint, arXiv 1606:02147, Jun. 2016, 10 pages.
Slussarenko et al., "Guiding light via geometric phases," *Nature Photonics* 10:571-575, 2016.
Wikipedia, "Dilation (morphology)," retrieved from https://en.wikipedia.org/wiki/Dilation (morphology) on Aug. 30, 2017, 4 pages.
Yaacobi et al., "Integrated phased array for wide-angle beam steering," *Optics Letters* 39(15):4575-4578, 2014.
Zhu et al., "Face Detection, Pose Estimation, and Landmark Localization in the Wild," 2012 IEEE Conference on Computer Vision and Pattern Recognition (CVPR), Providence, Rhode Island, Jun. 16-21, 2012, 8 pages.

* cited by examiner

LASER BEAM CONTROL METHOD, CORRESPONDING DEVICE, APPARATUS AND COMPUTER PROGRAM PRODUCT

BACKGROUND

Technical Field

The description relates to laser beam control.

One or more embodiments may facilitate protecting photon-damageable objects, e.g., the human eye, from the beam of a laser system, e.g., a Light Detection and Ranging (LIDAR) system, for instance in automotive applications.

Description of the Related Art

LIDAR systems are increasingly playing a role in certain sectors such as, e.g., the automotive field.

Being able to facilitate protection of the eyes or other damageable objects may thus represent an interesting feature when using, e.g., LIDAR systems: vehicles and cars are often in close proximity with living beings (e.g., humans and animals) which may be affected by a LIDAR beam.

A common approach for facilitating protection is based on maintaining an "eye safe" power level. This may prevent an undesired exposure of living beings with the disadvantage of sacrificing detection range: the farthest possible distance detectable by a LIDAR is related to the beam (e.g., peak) power. Examples of possible distance-to-power relationships are given in the following table.

| | Distance [m] | | | | |
|---|---|---|---|---|---|
| | 115 | 75 | 33 | 10 | 3.3 |
| Peak Power [W] | 180 | 76 | 15 | 1.36 | 0.15 |

Another common approach may involve replacing visible light, e.g., with a wavelength around 600 nm (1 nm=$10^{-9}$ m), with non-visible light, e.g., with wavelengths of around 1500 nm (nm=$10^{-9}$ m). These longer wavelengths may have the advantage of being non-focusable by the eye, which may be effective in preventing any damage, while having the disadvantage of using appropriate photoreceptors for such wavelengths which are less sensitive.

To sum up, common approaches, e.g., in LIDAR systems may be unable to provide a high range and a high accuracy, due to an inherent tradeoff between the power used to scan the scene and the accuracy of the estimated depth.

BRIEF SUMMARY

In an embodiment, a method includes: receiving at least one image of an environment around a laserlight beam source, processing the at least one image by detecting the presence of at least one laserlight-sensitive region therein and calculating a pixel occupancy map indicative of the position of said at least one region in the at least one image, and controlling the laserlight beam source as a function of said pixel occupancy map. In an embodiment, controlling the laserlight beam source as a function of said pixel occupancy map includes one or more of: deflecting the laserlight beam away from said at least one laserlight-sensitive region, and reducing the intensity of the laserlight beam directed towards said at least one laserlight-sensitive region. In an embodiment, calculating said pixel occupancy map includes applying to the at least one image one or more of: semantic image segmentation, object detection, and domain-specific segmentation. In an embodiment, calculating said pixel occupancy map includes: i) calculating a plurality of partial occupancy maps by applying to the at least one image one or more of: semantic image segmentation, object detection, domain-specific segmentation, and ii) calculating said pixel occupancy map as a combination of partial occupancy maps out of said plurality of partial occupancy maps. In an embodiment, the method includes: calculating said partial occupancy maps as binary maps, and calculating said pixel occupancy map as a logic combination of said partial occupancy maps out of said plurality of partial occupancy maps. In an embodiment, the method includes: receiving a time sequence of images of said environment around a laserlight beam source, and applying motion vector estimation to a pixel occupancy map for an image in said sequence to calculate an estimated occupancy map for a subsequent image in said sequence. In an embodiment, the method includes applying to said estimated occupancy map a dilation morphological operator. In an embodiment, the method includes: receiving images of the environment around the laserlight beam source from a plurality of image sources, projecting in a normalized space the images from said plurality of image sources, and calculating said pixel occupancy map from the images projected in said normalized space.

In an embodiment, a device includes: a receiver for receiving at least one image of an environment around a laserlight beam source, a processor coupled with the receiver for detecting the presence of at least one laserlight-sensitive region in the at least one image and calculating a pixel occupancy map indicative of the position of said region in the at least one image, and a controller for controlling the laserlight beam source as a function of said pixel occupancy map according to one or more of the methods disclosed herein.

In an embodiment, an apparatus includes: at least one image capture device for capturing at least one image of an environment around a laserlight beam source, and a device including: a receiver for receiving the at least one image of an environment around a laserlight beam source, a processor coupled with the receiver for detecting the presence of at least one laserlight-sensitive region in the at least one image and calculating a pixel occupancy map indicative of the position of said region in the at least one image, and a controller for controlling the laserlight beam source as a function of said pixel occupancy map. In an embodiment, the apparatus includes said laserlight beam source coupled to said device wherein the laserlight beam source is controlled by said controller as a function of said pixel occupancy map. In an embodiment, the laserlight beam source includes a LIDAR source. In an embodiment, the controller includes at least one beam deflector selectively controllable to scan said environment around the laserlight beam source and to deflect the laserlight beam away from said at least one laserlight-sensitive region.

In an embodiment, a computer program product, loadable in the memory of at least one processing system includes software code portions for performing one or more of the methods disclosed herein, when the product is run on at least one processing system.

In an embodiment, a method comprises: receiving, by image processing circuitry, one or more images of an environment around a laserlight beam source; identifying, by the image processing circuitry, one or more laserlight-sensitive regions based on the one or more images; generating, by the image processing circuitry, an indication of one or more positions corresponding to the one or more laserlight sensitive regions; and controlling the laserlight beam source based on the indication of one or more positions corresponding to the one or more laserlight sensitive regions. In an embodiment, controlling the laserlight beam source based on said indication of one or more positions corresponding to the one or more laserlight sensitive regions includes one or more of: deflecting a laserlight beam away from said one or more laserlight-sensitive regions; and reducing an intensity of the laserlight beam directed towards said one or more laserlight-sensitive regions. In an embodiment, identifying the one or more laserlight sensitive regions includes applying to the one or more images one or more of: semantic image segmentation; object detection; and domain-specific image segmentation. In an embodiment, generating the indication of one or more positions corresponding to the one or more laserlight sensitive regions includes: generating a plurality of partial occupancy maps; and combining the plurality of partial occupancy maps, generating a pixel occupancy map. In an embodiment, the method comprises: generating said partial occupancy maps as binary maps; and generating the pixel occupancy map as a logic combination of said partial occupancy maps. In an embodiment, the method comprises: receiving a time sequence of images of said environment around a laserlight beam source, wherein the generating the indication of one or more positions corresponding to the one or more laserlight sensitive regions comprises generating estimated motion vectors based on the one or more identified laserlight sensitive regions and the indication is indicative of one or more estimated positions corresponding to the one or more laserlight sensitive regions. In an embodiment, the generating the indication of one or more positions corresponding to the one or more laserlight sensitive regions comprises applying a dilation morphological operator to one or more of the one or more estimated positions corresponding to the one or more laserlight sensitive regions. In an embodiment, the method comprises: receiving images of the environment around the laserlight beam source from a plurality of image sources; projecting in a normalized space the images from said plurality of image sources; identifying the one or more laserlight sensitive regions based on the images projected in the normalized space; and generating said indication of one or more positions corresponding to the one or more laserlight sensitive regions based on the identified one or more laserlight sensitive regions.

In an embodiment, a device comprises: one or more interfaces, which, in operation, receive one or more images; and image processing circuitry, coupled to the one or more interfaces, wherein the image processing circuitry, in operation: identifies one or more laserlight-sensitive regions based on the one or more images; generates one or more indications of one or more positions corresponding to the one or more laserlight sensitive regions; and generates control signals to control one or more laserlight beam sources based on the one or more indications. In an embodiment, the image processing circuitry, in operation, generates control signals control one or more of: deflection of a laserlight beam away from said one or more laserlight-sensitive regions; and an intensity of the laserlight beam directed towards said one or more laserlight-sensitive regions. In an embodiment, the image processing circuitry, in operation, applies to the one or more images one or more of: semantic image segmentation; object detection; and domain-specific image segmentation. In an embodiment, the image processing circuitry, in operation: generates a plurality of partial occupancy maps; and combines the plurality of partial occupancy maps, generating a pixel occupancy map indicative of one or more positions corresponding to the one or more laserlight sensitive regions. In an embodiment, the image processing circuitry, in operation: generates said partial occupancy maps as binary maps; and generates the pixel occupancy map as a logic combination of said partial occupancy maps. In an embodiment, the one or more interfaces, in operation, receive a time sequence of images; and the image processing circuitry, in operation, generates the one or more indications of one or more positions corresponding to the one or more laserlight sensitive regions using estimated motion vectors based on the one or more identified laserlight sensitive regions and an indication is indicative of one or more estimated positions corresponding to the one or more laserlight sensitive regions. In an embodiment, the image processing circuitry, in operation, applies a dilation morphological operator to one or more of the one or more estimated positions corresponding to the one or more laserlight sensitive regions. In an embodiment, the one or more interfaces, in operation, receive images from a plurality of image sources; and the image processing circuitry, in operation, projects, in a normalized space, the images from said plurality of image sources; identifies the one or more laserlight sensitive regions based on the images projected in the normalized space; and generates said one or more indications of one or more positions corresponding to the one or more laserlight sensitive regions based on the identified one or more laserlight sensitive regions.

In an embodiment, a system comprises: image processing circuitry, which, in operation, identifies one or more laserlight-sensitive regions based on one or more images; and generates one or more indications of one or more positions corresponding to the one or more laserlight sensitive regions; and laserlight beam control circuitry, which, in operation, generates control signals to control one or more laserlight beam sources based on the one or more indications. In an embodiment, the system comprises: one or more image capture circuits, which, in operation, capture the one or more images. In an embodiment, the system comprises: one or more laserlight beam sources, which, in operation, are controlled by the one or more control signals. In an embodiment, the one or more laserlight beam sources include one or more Light Detection and Ranging (LIDAR) sources. In an embodiment, one or more of the laserlight beam sources includes a beam deflector.

In an embodiment, a non-transitory computer-readable medium's contents cause a laserlight beam system to perform a method, the method comprising: generating one or more images of an environment around a laserlight beam source; identifying one or more laserlight-sensitive regions based on the one or more images; generating an indication of one or more positions corresponding to the one or more laserlight sensitive regions; and controlling one or more laserlight beam sources based on the indication of one or more positions corresponding to the one or more laserlight sensitive regions. In an embodiment, the method comprises one or more of: deflecting a laserlight beam away from said one or more laserlight-sensitive regions; and reducing an intensity of a laserlight beam directed towards said one or more laserlight-sensitive regions. In an embodiment, the method comprises applying to the one or more images one or more of: semantic image segmentation; object detection; and domain-specific image segmentation. In an embodiment, the method comprises: receiving a time sequence of images of said environment around a laserlight beam source, wherein the generating the indication of one or more positions corresponding to the one or more laserlight sensitive regions comprises generating estimated motion vectors based on the one or more identified laserlight sensitive regions and the indication is indicative of one or more estimated positions corresponding to the one or more laser-light sensitive regions.

One or more embodiments may include a corresponding device (e.g., a LIDAR device), corresponding apparatus (e.g., an Advanced Driver-Assistance System (ADAS) system including such a device) as well as a computer program product loadable in the memory of at least one processing module (e.g., a computer) and including software code portions for executing the steps of the method when the product is run on at least one processing module. As used herein, reference to such a computer program product is understood as being equivalent to reference to a computer-readable medium containing instructions to control the processing system in order to co-ordinate implementation of the method according to one or more embodiments. Reference to "at least one computer" is intended to highlight the possibility for one or more embodiments to be implemented in modular and/or distributed form.

One or more embodiments may rely on laser control based on visual information, e.g., a system coupled with a camera and equipped with a moderately powerful image processing tool.

One or more embodiments may involve pre-analyzing a surrounding region and then adjusting (deflecting and/or modulating the power of) a laser beam accordingly.

In one or more embodiments, a pixel-level accurate image segmentation and classification approach may be used to preserve accuracy.

In one or more embodiments beam control may be based on the environment as acquired, e.g., by a camera.

One or more embodiments may be applied to various contexts wherein light-sensitive areas may be detected and a laser beam adjusted accordingly.

BRIEF DESCRIPTION OF THE SEVERAL VIEWS OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

A passive detection approach to detect occurrence of a sensitive object may be able to detect the presence of the objects only after they are exposed to a (high power) beam by measuring the absorbed power. A passive approach may thus be inherently unable to cope with the technical problem of protecting, e.g., a human eye before the exposure to possible undesired situations.

Figure 1:
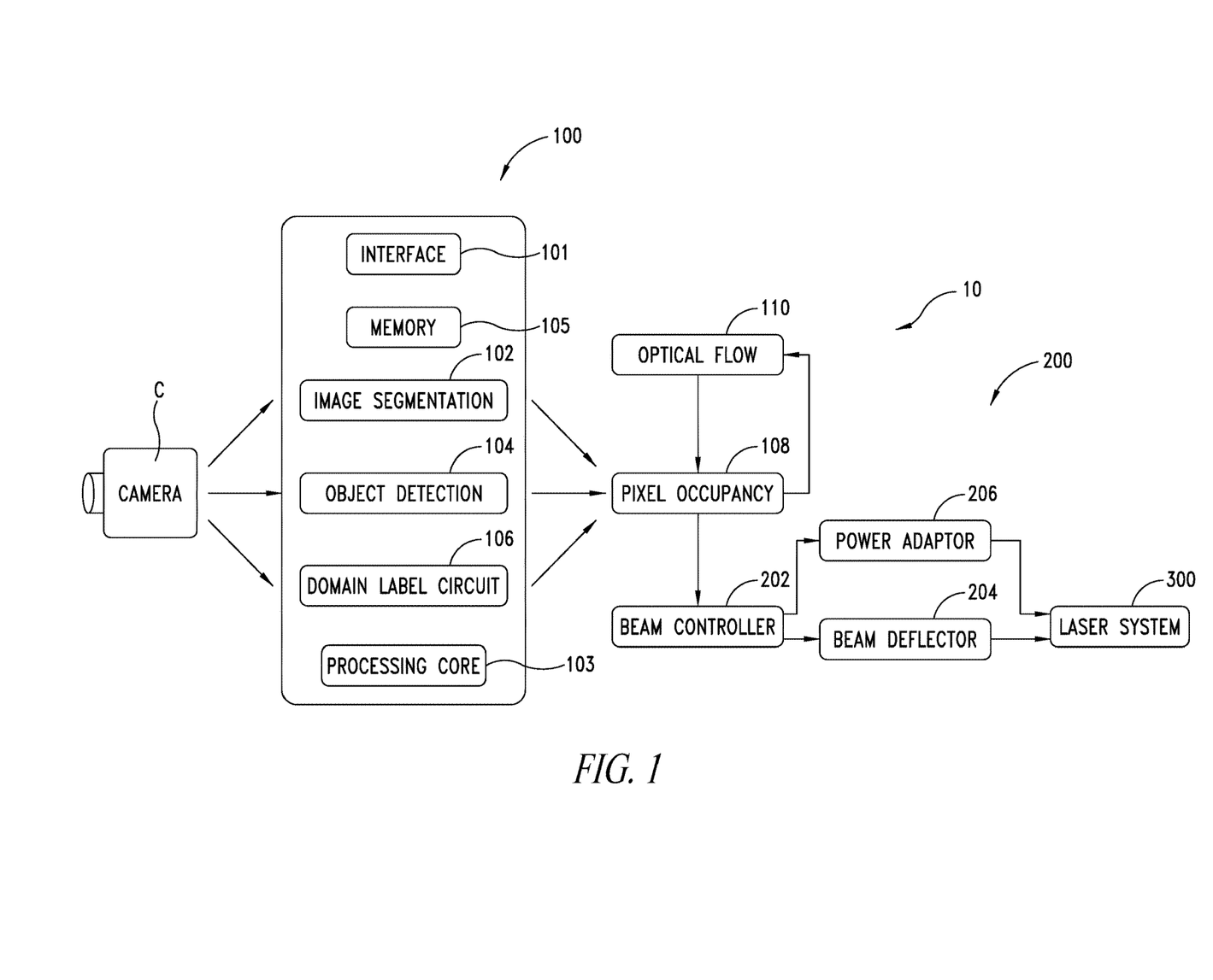
FIG. 1 is a block diagram exemplary of one or more embodiments.

In one or more embodiments, as exemplified in FIG. 1, an apparatus 10 may include an image processing device 100 receiving an image (e.g., from a surrounding environment of a motor vehicle, not visible in the figures) from one or more cameras C.

In one or more embodiments, the image processing device 100 may include various processing circuits or modules such as, e.g., one or more interfaces 101 to receive images, one or more processing cores 103, one or more memories 105, an image segmentation circuit or module 102, an object detection circuit module 104 and a domain-specific label circuit or module 106. For example, an interface 101 may receive one or more images, which are processed by the one or more processing cores 103 to perform one or more of functions, such as image segmentation, object detection or domain specific segmentation. The one or more memories 105 may store, e.g., image data, look-up tables, instructions, etc., which may be used by the one or more processing cores 103 to process the images.

In one or more embodiments, these modules may co-operate as discussed in the following in producing a pixel occupancy map 108 as a function of an optical flow 110.

Occupancy maps are a tool used, e.g., in probabilistic robotics, in order to represent a (3D) map of an environment as an evenly spaced field of binary random variables (e.g., as approximate a posteriori estimates for these random variables) representing the presence of an obstacle at a location in the environment.

In one or more embodiments, a pixel occupancy map such as 108 may provide a (2D) map in the pixel space of a camera representative of the surrounding area (e.g., the area surrounding a car) as a field of binary random variables indicating the presence of a laserlight-sensitive object (e.g., the eyes of a pedestrian or an animal walking alone or along with the pedestrian).

Reference 200 denotes an actuating system 200, which, in one or more embodiments, may include, e.g., a beam controller circuit 202 (e.g., operating in a LIDAR space), a beam deflector circuit 204 and a power adaptor circuit 206 intended to control a laser system 300 (e.g., a LIDAR system).

In one or more embodiments the laser system 300 may include—e.g., in a manner known per se—a laser source (possibly including an array of laser light generators), a photoreceptor module and a computational module to calculate the distance to the objects for reproducing the surrounding environment.

In one or more embodiments, the pixel occupancy map 108 may be provided as an output of the image processing device 100 (e.g., a digital image processor) to be exploited by the actuating system 200 which (e.g., when the trajectory of the beam is in the vicinity of sensitive areas identified in the pixel occupancy map 108) may act on a beam emitted by the laser system 300, e.g., by deflecting the beam via the beam deflector 204 and/or by attenuating the power of the beam, e.g., via the power modulator 206.

As indicated, the sensitive regions intended to be avoided in the pixel occupancy map 108 may include regions in the images located at an object (e.g., a human or an animal) which may be adversely affected by the radiation of the laser system.

Just to make a non-limiting example related to the automotive field, such an object may be the head (e.g., the eyes) of one or more pedestrians walking on a zebra-crossing in front of a motor car equipped with LIDAR-based ADAS apparatus. It will be noted that one or more embodiments may provide protection irrespective of such subjects being tall or short (e.g., children). Also, protection may extend to animals, e.g., to animals walking in the vicinity of a pedestrian or in the path of an automobile.

It will be otherwise appreciated that while presented here as distinct entities for the sake of simplicity and ease of illustration, in one or more embodiments certain ones of the entities C, 100, 200, 300 may be incorporated to integrated entities, e.g., with the image processing device 100 and/or the actuating system 200 integrated with the camera C and the laser system 300, respectively.

In one or more embodiments, the camera C may be used having a Video Graphics Accelerator/Adapter (VGA) resolution (e.g., 640×480 pixel) or even higher.

In one or more embodiments, the (video) camera C may display a high frame rate, e.g., 30-60 fps (frame per second), in order to minimize detection latency, the delay between capturing an image and detecting the sensitive regions.

In one or more embodiments the image processing device 100 may receive as an input an image obtained from the camera C and generate as an output an entry in the pixel occupancy map 108.

In one or more embodiments, the pixel occupancy map 108 may include a binary image storing the information on the surroundings and the sensitive regions (e.g., 1=sensitive, 0=non-sensitive) and may be generated based on one or more of the following approaches:
- a semantic image segmentation (e.g., circuit or module 102),
- an object detection (e.g., circuit or module 104) by means of a pixel level recognition procedure, and
- a domain specific segmentation (e.g., circuit or module 106).

Each of the previous circuits or modules (which may operate based on principles known in the art) may produce a partial occupancy map which may contribute to the final occupancy map 108.

One or more embodiments may exploit only one of the detection modules or subsystems 102, 104, 106 or alternatively a partial or full combination thereof.

For instance, in one or more embodiments, an OR operator may be applied to the partial occupancy maps from the modules 102, 104, 106 to obtain the final pixel occupancy map 108. Thus, in various embodiments a value 1 (e.g., avoidance) may be present in the final occupancy map 108 if at least one of the partial maps shows the same value.

In one or more embodiments, another approach may be to implement various subsystems/modules in a cascaded arrangement: for instance, such a possible cascaded arrangement may include image segmentation 102 (returning information on—where—e.g., people are) and object detection 104 (recognizing, e.g., an area where a face may be in the already obtained regions).

In such an exemplary case, the two partial occupancy maps may be handled as if fed to an AND operator, so that the pixel occupancy map 108 will correspond to the last partial occupancy map in the cascade.

This approach may be more efficient since the cascaded object detection (e.g., module 104) may be performed only on a region previously selected (e.g., in module 102). Also, this approach may be more accurate since it may reduce the number of false positives (e.g., a presence of a face where no person is detected).

Another example of such a cascaded processing may include:
- image segmentation (e.g., at 102) providing information on the presence of persons,
- object detection (e.g., at 104), recognizing the presence of a face, and
- a more specific image segmentation (e.g., again performed at 102), such as an eye classifier.

In a simple implementation of one or more embodiments, sensitive regions enclosing a detected object may include a rectangular shape, located around the sensitive object.

In more complex approaches in one or more embodiments, the image processing device 100 may exploit so-called Active Appearance Models (see, e.g., Cootes, T. (2001), *Active Appearance Models*, Pattern Analysis and Machine Intelligence, 23(6), 681-685) that are able to fit around the shape of the object, such as, e.g., face landmark detection (see, e.g., X. Zhu and D. Ramanan, "Face detection, pose estimation, and landmark localization in the wild," 2012 IEEE Conference on Computer Vision and Pattern Recognition, Providence, R.I., 2012, pp. 2879-2886) that may return a set of points around the eyes and mouth, which may be used to generate a fairly accurate occupancy map 108.

One or more embodiments may exploit a domain-specific segmentation (e.g., module 106) approach, including, e.g., a skin segmentation algorithm (see, e.g., P. Kakumanu, S. Makrogiannis, N. Bourbakis, "A survey of skin-color modeling and detection methods," Pattern Recognition, Volume 40, Issue 3, March 2007, Pages 1106-1122), of the type used in reliably identifying hands and faces in images. As in the cases discussed previously, a partial occupancy map may be generated, detecting, e.g., skin/no skin regions and selecting sensitive labels.

In one or more embodiments, the circuit or module 102 in the image processing device 100 may include fast and accurate segmentation procedures (of any known type, see, e.g., Paszke, A., Chaurasia, A., Kim, S., & Culurciello, E. (2016), *ENet: A Deep Neural Network Architecture for Real-Time Semantic Segmentation*, Arxiv. Computer Vision and Pattern Recognition, arXiv:1606.02147v1 [csCV] (June 2016)), which may also be customized for a current application: these procedures may be configured to detect not only faces, but also, e.g., specific features in a face, such as eyes.

For instance, such a (semantic) image segmentation procedure may receive as an input an image from the camera C and return an output image with selected labels 0 . . . L, where L is the number of objects that the segmentation may recognize.

Just by way of explanatory example, L=4 may be 1=sky, 2=road, 3=person, 4=tree, 0=not known (when a class may not be confidently assigned).

As a further explanatory example, a set of one or more of such labels $A_v = \{L_1, \ldots, L_k\}$, e.g., person and/or dog, may be identified as sensitive and a partial pixel occupancy map may be set as, e.g., one in the regions corresponding to these sensitive labels, that is falling inside the set of labels $A_v$.

Of course, those given here are mere examples of a possible flow of the image segmentation process, with the classes being suited to be more specific, e.g., parts of the body where the sensitive areas are recognized to be the eyes.

One or more embodiments may thus include generating a pixel occupancy map 108 which provides information on the class of an object and confidence of the computed prediction.

For instance, one or more embodiments may not be limited to partial or pixel 108 occupancy maps which are "binary" (that is 1=avoidance; 0=non-avoidance). In one or more embodiments the image processing device 100 may generate a sort of "fuzzy" pixel occupancy map 108 indicating, e.g., a level of possible negative effect or even retain an information on other operational features that may be used by the actuating system 200.

One or more embodiments may benefit from the efficiency of the image processing step, e.g., by processing in the system 100 being comparable with (and optionally faster than) the velocity at which the beam of the laser system 300 scans the surrounding environment.

In one or more embodiments, this may be achieved by techniques which are known in the art, such as Convolutional Neural Networks (CNNs) for object detection and image segmentation that may achieve a rate of 30-40 billion operations per frame (circa 1 TOPS—Tera Operations Per Second).

One or more embodiments may adopt high-performance platforms as already proposed for Advanced Driving Assistance Systems (ADAS): NVIDIA, that promotes a PX2 platform which operates at 24 TOPS, and Mobileye, that promotes a EyeQ5 platform which operates at 12 TOPS, may be exemplary of such platforms.

In one or more embodiments, temporal consistency is a factor which may be considered in adjusting the beam 200.

The image processing device 100 may exhibit an inherent latency due to the fixed rate at which the image is taken and/or to the velocity at which each pixel may be processed. Such a latency may not be eliminated even when considering a possible ideal scenario of processing taking place simultaneously with reading the image pixels, insofar as processing will be constrained by the pixel reading rate. Moreover, the laser beam may scan the scene at its own independent rate, so that deflection may occur, e.g., tens of milliseconds after the occupancy map 108 is generated. The occupancy map 108 may thus result obsolete after that period of time and may not mirror satisfactorily the actual position of an object to be protected.

In one or more embodiments, that issue may be addressed by using a current pixel occupancy as a basis for computing a subsequent occupancy map.

In one or more embodiments, such an approach may be implemented via an optical flow of the scene, e.g., estimated from pairs of frames, as represented by block 110 in FIG. 1.

In one or more embodiments, an object position at the time of the LIDAR scan may be estimated by extrapolating the occupancy map 108' from the pixel occupancy map 108 at the time of frame acquisition using a dense field of motion vectors.

Optical flow computation arrangements have been currently considered for use in ADAS systems (Advanced Driving Assistance Systems).

Figure 2:
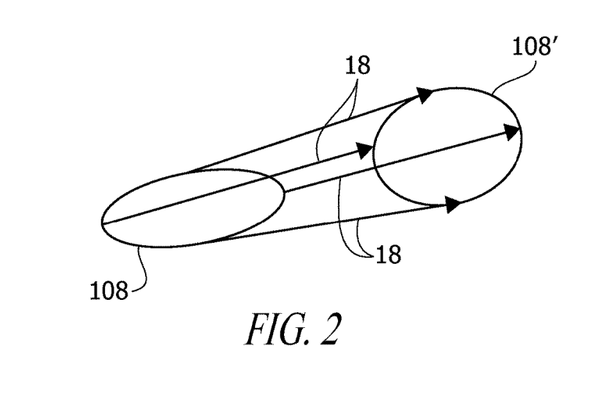
FIGS. 2 and 3 are exemplary image processing according to one or more embodiments.

By way of exemplary explanation of possible operation of such arrangements as possibly used in one or more embodiments, a pixel occupancy map 108 may be represented by an ellipse of pixels as depicted in FIG. 2.

An estimated (e.g., extrapolated) occupancy map 108', illustrated with a second ellipse of pixels, may represent a possible variation of the map after an estimated delay between the time the occupancy map 108 is generated and the time the region may be exposed to the laser beam.

An estimated motion vector (e.g., v(x,y)—in pixels per second) may be calculated for each pixel, with the vector possibly varying appreciably from one pixel to the other. An estimated delay Δt may be used along with the estimated motion vector to calculate the extrapolated occupancy map 108' from the occupancy map 108: e.g., the occupancy map 108 may be shifted by, e.g., v(x,y)*Δt pixels, resulting in the extrapolated occupancy map 108'.

Pixel motion, as previously described, is exemplified in FIG. 2 by arrows 18. The arrows start at a pixel in the occupancy map 108 and point to a pixel corresponding to the same feature in the extrapolated occupancy map 108'.

In one or more embodiments, a certain degree of uncertainty may be considered, e.g., using a dilation morphological operator 18' with radius equal to the standard deviation of the of the estimate, e.g., 5 pixels, that is, the standard deviation concerns the uncertainty of extrapolation, e.g., by using the average standard deviation of the motion vectors in a neighborhood of a pixel. As exemplified in FIG. 3, the dilation operation may use the dilation morphological operator 18' to probe and expand the borders of the extrapolated occupancy map 108' to calculate an expanded occupancy map 108" taking into accounts uncertainties.

Figure 3:
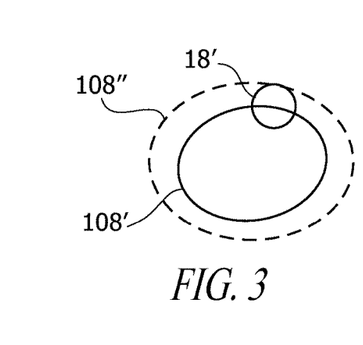

In one or more embodiments, such an optical flow 110 may provide a feedback mechanism, with the expanded occupancy map 108" being dependent on the previously computer occupancy map 108 and the motion vectors of the scene.

In one or more embodiments, one or more of the pixel occupancy maps, e.g., 108", 108' or 108, is converted by the beam controller 202 to calculate a space map that is used to modify (e.g., via the modules 204, 206) the beam of the laser system 300 scanning the surrounding environment.

For instance, in normal operating conditions, such beam scans the surrounding environment line by line with a high frequency in the horizontal direction and a lower frequency in the vertical direction. The emitted beam may be reflected at the "target" object and such reflection may be measured by a photoreceptor, e.g., an Avalanche Photo Diode (APD).

The delay between the emission of a light pulse and the detection of a corresponding "echo" from a target object by a photoreceptor may be used in order to estimate the distance to the object, by means of a TOF—Time Of Flight— approach. Such approach is well known in the art and is calculated as a function of (light) velocity, distance and time.

In one or more embodiments, the beam deflector 204 may implement two different types of controls:
- a first one, which may be used in normal TOF operation,
- a second one, which may be used in case a sensitive region is detected, in order to avoid exposure of the region to the laser beam.

In one or more embodiments, these two different types of controls may be implemented via different beam deflector units, e.g., one for the "regular" scan movements and one for "avoidance" operation. Such an approach may facilitate decoupling TOF operation of the system 300 with respect to the other deflection beam control(s).

In one or more embodiments, these two different types of controls may resort to different techniques of beam deflection.

For instance, in one or more embodiments, based on a phased optical array (see, e.g., M. R. Watts, "Towards an Integrated Photonic LIDAR Chip," Imaging and Applied Optics 2015, OSA Technical Digest (online) (Optical Society of America, 2015), paper AIW4C.1), a LIDAR array may be implemented on a Photonic Integrated Circuit (PIC) with a maximum deflection angle of, e.g., 51°. While in conventional implementations the associated "tuning" frequency may be, e.g., 100 Hz, arrangements are known in the art (see, e.g., W. Ronny Huang, Juan Montoya, Jan E. Kansky, Shawn M. Redmond, George W. Turner, and Antonio Sanchez-Rubio, "High speed, high power one-dimensional beam steering from a 6-element optical phased array," Opt. Express 20, 17311-17318 (2012)) with operating frequencies in the range of, e.g., 40 MHz, which is well in the operating range of the embodiments as exemplified herein. Another feasible approach (see, e.g., J. C. Hulme, J. K. Doylend, M. J. R. Heck, J. D. Peters, M. L. Davenport, J. T. Bovington, L. A. Coldren, and J. E. Bowers, "Fully integrated hybrid silicon free-space beam steering source with 32 channel phased array," SPIE OPTO, International Society for Optics and Photonics, San Francisco (Calif.), February 2014) may include a passive laser and a light amplification stage integrated in the same chip, generating a fully integrated system with a high tuning frequency (50 MHz). Other solutions may admit tuning frequencies in the range of 60 GHz using appropriately designed silicon devices.

Also, in one or more embodiments, mirrors or spinning prisms may be used for creating a deflection beam that may be controlled by a Micro ElectroMechanical System (MEMS) or by an Acousto-Optic Modulator (AOM).

In one or more embodiments, a waveguide design may be used as a deflection beam, wherein the deflection is controlled by light polarization, e.g., via a bi-refringent material (see, e.g., S. Slussarenko, A. Alberucci, C. P. Jisha, B. Piccirillo, E. Santamato, G. Assanto and L. Marrucci, "Guiding light via geometric phases," Nature Photonics vol. 10, 571-575 (2016)).

One or more embodiments may use a single beam instead of a matrix of lasers because of many advantages, e.g., lower power consumption, adjustable regulation and the ability to control at each step the direction of the beam.

A wide range of laser beam scanning arrangements as currently available in the art may comply with the operation requirements of one or more embodiments.

Still by way of exemplary reference, in an application with 2 megapixel resolution and 30 fps scanning rate, each line may be scanned with at least a 30 kHz frequency and each pixel is scanned with a 60 MHz frequency.

Also, one may reasonably assume that sensitive areas will not be limited to the dimension of one pixel, but may include, e.g., ten pixels or more, so that the frequency at which the exposure takes place will be about 6 MHz. The specification for the response velocity of the deflection beam is thus 6 MHz (or higher) in an embodiment, which is fully compatible with the various implementations discussed in the foregoing.

Figure 4:
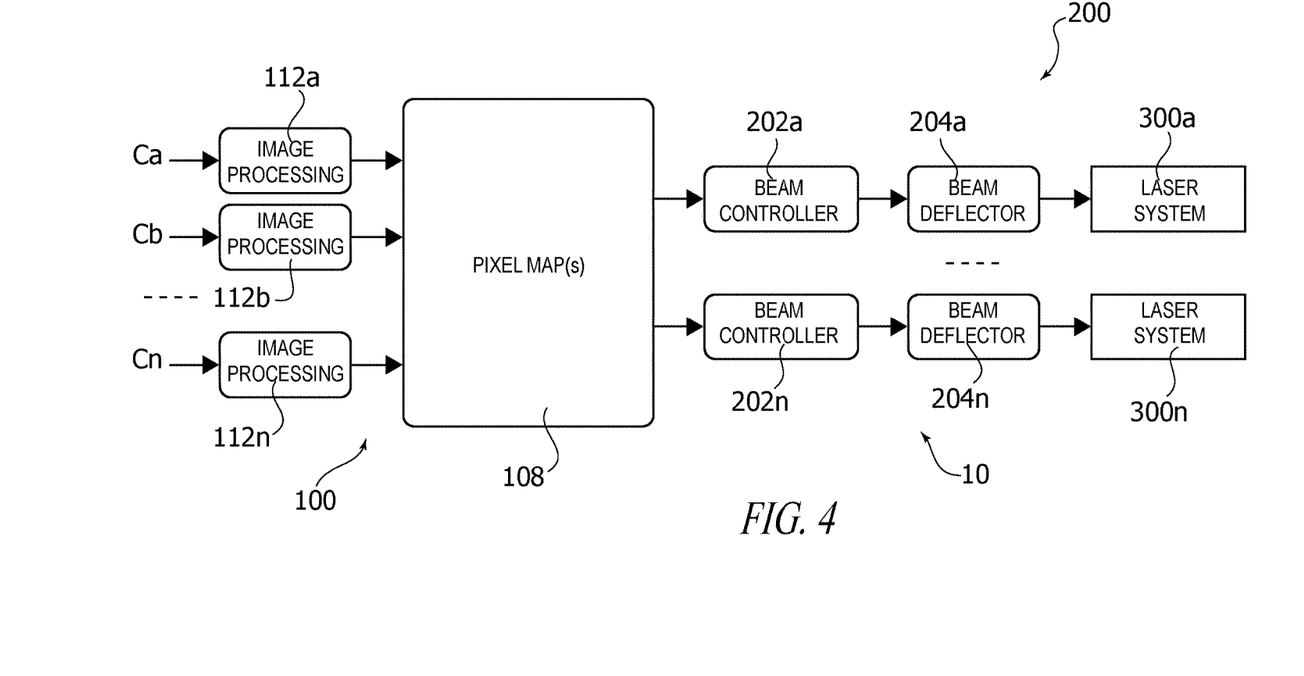
FIG. 4 is a block diagram exemplary of one or more embodiments.

One or more embodiments, as exemplified in FIG. 4, may be implemented for use in Advanced Driving Assistance Systems (ADAS), which typically are based on the use of multiple wide-angle synchronized cameras Ca, Cb, . . . , Cn and/or on the synthesis of a 360° view, e.g., a view in all the directions surrounding the, e.g., car. Such systems may be able to cover the entirety of the possible blind spots of, e.g., a driver.

In one or more embodiments, for example in wide-angle systems, more than one camera Ca, Cb, Cn may feed images to the image processing device 100. In one or more embodiments image processing may be performed on synthetized views based on normalized spaces obtained by normal projection by image processing circuitry 112a, . . . , 112n of the images acquired by the different cameras Ca, Cb, . . . , Cn.

In one or more embodiments, for example in wide-angle systems, multiple camera inputs may be merged together and different LIDAR units may be controlled by a same pixel occupancy map 108.

Waiting for the synthesis of a high-resolution, accurate view may undesirably affect latency; in one or more embodiments, e.g., once the cameras are calibrated, a map from a camera and a normalized pixel space may be available to be applied before a whole frame is acquired; also, convolutional neural networks (CNN's) which may be used for segmentation may involve local convolutions to compute a segmentation map, and thus do not require a whole image to be available in order to operate.

In one or more embodiments, the pixel occupancy map 108 may drive multiple laser systems 300a, 300b, . . . , 300n. For the sake of clarity and simplicity, these are exemplified to be in the same number as the cameras depicted in the system 10; however in one or more embodiments the number of laser systems 300 may be different from the number of cameras C.

In FIG. 4, reference numbers 202, 204 and 300 again denote beam controllers, beam deflectors and laser systems such as those encountered in FIG. 1, thus making it unnecessary to further explain the nature thereof. In FIG. 4 the subscript letter highlights the presence of more than one laser system with an associated control.

LIDAR technologies based on integrated photonics may exhibit a limited angular range (e.g., 50°); one or more embodiments may thus use multiple LIDAR units with overlapping coverage, with a pixel map projected in the working space of each separate unit (see, e.g., the diagrams in FIGS. 2 and 3).

Again, as already noted previously, in one or more embodiments, individual blocks as exemplified throughout the figures, may be either subdivided or integrated as more convenient in view of the prospected application.

In one or more embodiments, a method may include:
receiving (e.g., 100) at least one image (e.g., C) of an environment around a laserlight beam source (e.g., 300), such as a LIDAR system in an ADAS system in motor vehicle,
processing (e.g., 102, 104, 106) the at least one image by detecting the presence of at least one laserlight-sensitive region (e.g., the eyes of a human or animal) therein and calculating a pixel occupancy map (e.g., 108) indicative of the position of said at least one region in the at least one image, and
controlling (e.g., 200) the laserlight beam source as a function of said pixel occupancy map.

In one or more embodiments, controlling the laserlight beam source as a function of said pixel occupancy map may include at least one of:
deflecting (e.g., 204) the laserlight beam away from said at least one laserlight-sensitive region, and/or
reducing (e.g., 206) the intensity of the laserlight beam directed towards said at least one laserlight-sensitive region.

In one or more embodiments, calculating said pixel occupancy map may includes applying to the at least one image at least one of:
semantic image segmentation (e.g., 102), and/or
object detection (e.g., 104), and/or
domain-specific segmentation (e.g., 106).

In one or more embodiments, calculating said pixel occupancy map may include:
  i) calculating a plurality of partial occupancy maps (e.g., 102, 104, 106) by applying to the at least one image one of:
  semantic image segmentation, and/or
  object detection, and/or
  domain-specific segmentation,
  ii) calculating said pixel occupancy map as a combination of partial occupancy maps out of said plurality of partial occupancy maps.

One or more embodiments may include:
calculating said partial occupancy maps as binary maps,
calculating said pixel occupancy map as a logic combination (e.g., OR or AND) of said partial occupancy maps out of said plurality of partial occupancy maps.

One or more embodiments may include:
receiving a time sequence of images of said environment around a laserlight beam source,
applying motion vector estimation (e.g., 18) to a pixel occupancy map for an image in said sequence to calculate an estimated occupancy map (e.g., 108'; 108" in FIGS. 2 and 3) for a subsequent image in said sequence.

One or more embodiments may include applying to said estimated occupancy map a dilation operator (e.g., 18').

One or more embodiments may include:
receiving images of the environment around the laserlight beam source from a plurality of image sources (e.g., cameras Ca, Cb, . . . , Cn),
projecting in a normalized space (e.g., 112a, . . . , 112n) the images from said plurality of image sources, and
calculating said pixel occupancy map from the images projected in said normalized space.

A device according to one more embodiments may include:
  a receiver for receiving at least one image of an environment around a laserlight beam source,
  a processor coupled with the receiver for detecting the presence of at least one laserlight-sensitive region in the at least one image and calculating a pixel occupancy map indicative of the position of said region in the at least one image, and
  a controller for controlling the laserlight beam source as a function of said pixel occupancy map,
wherein the device is configured for operating with the method of one or more embodiments.

Apparatus according to one or more embodiments may include:
  at least one image capture device (e.g., a camera C) for capturing at least one image of an environment around a laserlight beam source, and
  a device according to one or more embodiments, the device coupled to the at least one image capture device, wherein the receiver in the device receives said at least one image from at least one image capture device (C).

Apparatus according to one or more embodiments may further include said laserlight beam source coupled to said device wherein the laserlight beam source is controlled by said controller as a function of said pixel occupancy map.

In one or more embodiments:
  the laserlight beam source may include a LIDAR source, and/or
  the controller may includes at least one beam deflector selectively controllable (e.g., "regular"/"avoidance") to scan said environment around the laserlight beam source and to deflect the laserlight beam away from said at least one laserlight-sensitive region. Without prejudice to the underlying principles, the details and embodiments may vary, even significantly, with respect to what has been disclosed by way of example only, without departing from the extent of protection.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A method, comprising:
  receiving, by image processing circuitry, one or more images of an environment around a laserlight beam source;
  identifying, by the image processing circuitry, one or more laserlight-sensitive regions based on the one or more images;
  generating, by the image processing circuitry, a pixel occupancy map indicative of one or more pixels corresponding to the one or more laserlight sensitive regions; and
  controlling the laserlight beam source based on the pixel occupancy map, wherein the generating the pixel occupancy map comprises generating estimated motion vectors based on the one or more identified laserlight sensitive regions and the pixel occupancy map is indicative, on a pixel by pixel basis, of one or more estimated pixels corresponding to the one or more laserlight sensitive regions.

2. The method of claim 1 wherein controlling the laserlight beam source based on said pixel occupancy map includes one or more of:
  deflecting a laserlight beam away from said one or more estimated pixels; or
  reducing an intensity of the laserlight beam directed towards said one or more estimated pixels.

3. The method of claim 1 wherein identifying the one or more laserlight sensitive regions includes applying to the one or more images one or more of:
  semantic image segmentation;
  object detection; and
  domain-specific image segmentation.

4. The method of claim 1 wherein generating the pixel occupancy map includes:
  generating a plurality of partial occupancy maps; and
  combining the plurality of partial occupancy maps, generating the pixel occupancy map.

5. The method of claim 4, comprising:
  generating said partial occupancy maps as binary maps; and
  generating the pixel occupancy map as a logic combination of said partial occupancy maps.

6. The method of claim 1, comprising:
  receiving a time sequence of images of said environment around the laserlight beam source.

7. The method of claim 6 wherein the generating the pixel occupancy map comprises applying a dilation morphological operator to one or more of the one or more estimated pixels corresponding to the one or more laserlight sensitive regions.

8. The method of claim 1, comprising:
  receiving images of the environment around the laserlight beam source from a plurality of image sources;
  projecting in a normalized space the images from said plurality of image sources;
  identifying the one or more laserlight sensitive regions based on the images projected in the normalized space; and
  generating said pixel occupancy map based on the identified one or more laserlight sensitive regions.

9. A device, comprising:
  one or more interfaces, which, in operation, receive one or more images; and
  image processing circuitry, coupled to the one or more interfaces, wherein the image processing circuitry, in operation:
    identifies one or more laserlight-sensitive regions based on the one or more images;
    generates a pixel occupancy map indicative of one or more pixels corresponding to the one or more laserlight sensitive regions; and
    generates control signals to control one or more laserlight beam sources based on the pixel occupancy map, wherein
  the image processing circuitry, in operation, generates the pixel occupancy map using estimated motion vectors based on the one or more identified laserlight sensitive regions and the pixel occupancy map is indicative, on a pixel by pixel basis, of one or more estimated pixels corresponding to the one or more laserlight sensitive regions.

10. The device of claim 9 wherein the image processing circuitry, in operation, generates control signals to control one or more of:
  deflection of a laserlight beam away from said one or more estimated pixels; or
  an intensity of the laserlight beam directed towards said one or more estimated pixels.

11. The device of claim 9 wherein the image processing circuitry, in operation, applies to the one or more images one or more of:
  semantic image segmentation;
  object detection; or
  domain-specific image segmentation.

12. The device of claim 9 wherein the image processing circuitry, in operation:
  generates a plurality of partial occupancy maps; and
  combines the plurality of partial occupancy maps, generating the pixel occupancy map.

13. The device of claim 12 wherein the image processing circuitry, in operation:
  generates said partial occupancy maps as binary maps; and
  generates the pixel occupancy map as a logic combination of said partial occupancy maps.

14. The device of claim 9, wherein:
  the one or more interfaces, in operation, receive a time sequence of images.

15. The device of claim 14 wherein the image processing circuitry, in operation, applies a dilation morphological operator to one or more of the one or more estimated pixels corresponding to the one or more laserlight sensitive regions.

16. The device of claim 9, wherein:
  the one or more interfaces, in operation, receive images from a plurality of image sources; and
  the image processing circuitry, in operation,
    projects, in a normalized space, the images from said plurality of image sources;
    identifies the one or more laserlight sensitive regions based on the images projected in the normalized space; and
    generates said pixel occupancy map based on the identified one or more laserlight sensitive regions.

17. A system, comprising:
  image processing circuitry, which, in operation,
    identifies one or more laserlight-sensitive regions based on one or more images; and
    generates a pixel occupancy map using estimated motion vectors based on the one or more identified laserlight sensitive regions and the pixel occupancy map is indicative, on a pixel by pixel basis, of one or more estimated pixels corresponding to the one or more laserlight sensitive regions; and
  laserlight beam control circuitry, which, in operation, generates control signals to control one or more laserlight beam sources based on the pixel occupancy map.

18. The system of claim 17, comprising:
  one or more image capture circuits, which, in operation, capture the one or more images.

19. The system of claim 17, comprising:
  one or more laserlight beam sources, which, in operation, are controlled by the one or more control signals.

20. The system of claim 19 wherein the one or more laserlight beam sources include one or more Light Detection and Ranging (LIDAR) sources.

21. The system of claim 19 wherein the one or more of the laserlight beam sources include a beam deflector.

22. A non-transitory computer-readable medium having contents which, in operation, cause a laserlight beam system to perform a method, the method comprising:
  generating one or more images of an environment around a laserlight beam source;

identifying one or more laserlight-sensitive regions based on the one or more images;
generating a pixel occupancy map indicative of one or more pixels corresponding to the one or more laserlight sensitive regions; and
controlling one or more laserlight beam sources based on the pixel occupancy map, wherein the generating the pixel occupancy map comprises generating estimated motion vectors based on the one or more identified laserlight sensitive regions and the pixel occupancy map is indicative, on a pixel by pixel basis, of one or more estimated pixels corresponding to the one or more laserlight sensitive regions.

23. The non-transitory computer-readable medium of claim 22 wherein the method comprises one or more of:
  deflecting a laserlight beam away from said one or more estimated pixels; or
  reducing an intensity of the laserlight beam directed towards said one or more estimated pixels.

24. The non-transitory computer-readable medium of claim 22 wherein the method comprises applying to the one or more images one or more of:
  semantic image segmentation;
  object detection; and
  domain-specific image segmentation.

25. The non-transitory computer-readable medium of claim 22 wherein the method comprises:
  receiving a time sequence of images of said environment around the laserlight beam source.

26. The non-transitory computer-readable medium of claim 22 wherein generating the pixel occupancy map includes:
  generating a plurality of partial occupancy maps; and
  combining the plurality of partial occupancy maps, generating the pixel occupancy map.

27. The non-transitory computer-readable medium of claim 26 wherein the method comprises:
  generating said partial occupancy maps as binary maps; and
  generating the pixel occupancy map as a logic combination of said partial occupancy maps.

28. The system of claim 17 wherein the image processing circuitry, in operation:
  generates a plurality of partial occupancy maps; and
  combines the plurality of partial occupancy maps, generating the pixel occupancy map.

29. The system of claim 28 wherein the image processing circuitry, in operation:
  generates said partial occupancy maps as binary maps; and
  generates the pixel occupancy map as a logic combination of said partial occupancy maps.

* * * * *